US007010645B2

(12) United States Patent
Hetzler et al.

(10) Patent No.: US 7,010,645 B2
(45) Date of Patent: Mar. 7, 2006

(54) SYSTEM AND METHOD FOR SEQUENTIALLY STAGING RECEIVED DATA TO A WRITE CACHE IN ADVANCE OF STORING THE RECEIVED DATA

(75) Inventors: Steven Robert Hetzler, Los Altos, CA (US); Daniel Felix Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 10/330,586

(22) Filed: Dec. 27, 2002

(65) Prior Publication Data

US 2004/0128470 A1 Jul. 1, 2004

(51) Int. Cl.
*G06F 12/00* (2006.01)

(52) U.S. Cl. ....................... 711/113; 711/118; 711/206; 711/143; 714/6

(58) Field of Classification Search ................ 707/202; 711/113, 3
See application file for complete search history.

(56) References Cited

U.S. PATENT DOCUMENTS 5,586,291 A 12/1996 Lasker et al.
5,996,054 A * 11/1999 Ledain et al. ............... 711/203
6,016,553 A 1/2000 Schneider et al.
6,021,408 A 2/2000 Ledain et al.
6,112,277 A 8/2000 Bui et al.
6,148,368 A * 11/2000 DeKoning .................. 711/113
6,516,380 B1 * 2/2003 Kenchammana-Hoskote et al. ................ 711/3
6,578,041 B1 * 6/2003 Lomet ........................ 707/102
2002/0099907 A1 * 7/2002 Castelli et al. .............. 711/113
2002/0108017 A1 8/2002 Kenchammana-Hosekote et al.

OTHER PUBLICATIONS

Ron White. How Computers Work. 2004, Que Publishing, 7th ed., pp. 49-51.*

* cited by examiner

*Primary Examiner*—Donald Sparks
*Assistant Examiner*—Jesse Diller
(74) *Attorney, Agent, or Firm*—Khanh Q. Tran; Mark C. McCabe

(57) ABSTRACT

The invention provides a method and system for staging write data to improve a storage system's performance. The method includes providing a write cache on the medium. The write cache includes a plurality of cache lines. Each of the cache lines includes a plurality of data blocks, line meta-data to identify each data blocks sector address, and a sequential number indicating the order of the data blocks within their respective cache line relative to the other data blocks in the cache line. In addition, the method includes staging write data in the write cache as sequentially written data to improve performance of the system. The staging includes receiving a plurality of data blocks to be written to the system. Moreover, the staging includes storing the data blocks in one of the cache lines.

26 Claims, 9 Drawing Sheets

SYSTEM AND METHOD FOR SEQUENTIALLY STAGING RECEIVED DATA TO A WRITE CACHE IN ADVANCE OF STORING THE RECEIVED DATA

TECHNICAL FIELD

This invention generally relates to data storage devices and systems, and more particularly to a log-structured write cache for improving the performance of these devices and systems by converting random writes of data into sequential writes of data.

BACKGROUND OF THE INVENTION

Log-structured storage systems have been proposed to improve the performance of writing data by converting random writes to sequential writes. Storage devices, such as hard disk drives, have sequential access throughput that is orders of magnitude faster than random I/O throughput. However, log-structured storage devices and systems are expensive to implement, and have significant drawbacks. While random writes are converted to sequential writes, sequential reads tend to be converted to random reads, thus negating any performance gains. Typically, log-based file systems are more complex to implement and manage. The net result is that log-structured storage devices and systems are not widely deployed.

Kenchammana-Hoskote and Sarkar (U.S. Patent Application U.S. Pat. No. 6,516,380 describes a prior art solution in which data writes are logged sequentially to a separate storage device and in which the meta-data associated with the log is recorded disjointly from the log. This solution is not viable in the case of a single primary storage medium as it requires the independence of the log from the primary medium to maintain performance coherency.

Mattson and Menon (U.S. Pat. No. 5,416,915) describes another prior art solution in which write performance is enhanced by parallelizing the write operations over an array of disks. This solution does not take advantage of the performance of sequential writing.

Rosenblum et al ("The Design and Implementation of a Log Structured File System," ACM Transactions on Computer Systems, V10-1, February 1992, pp. 26–52) describes yet another prior art solution in which a file system is designed to make sequential writes for performance reasons. However, this solution is only applicable to systems where a log-structured file system can be implemented; and is hence host dependent. In addition, the full performance of such a system will not be realized unless the file system is cognizant of the underlying properties of the storage system; this is typically not the case.

Therefore, there remains a need for a log-structured write cache for use in storage devices and systems that can efficiently write random data without the above-described disadvantages

SUMMARY OF THE INVENTION

The invention provides a method for improving storage system performance through sequentially staging received data to a write cache in advance of storing the received data to the storage system. The method includes providing a write cache on the medium. The write cache includes a plurality of cache lines. Each of the cache lines includes a plurality of data blocks, line meta-data to identify each data blocks sector address, and a sequential number indicating the order of the data blocks within their respective cache line relative to the other data blocks in the cache line. In addition, the method includes staging write data in the write cache as sequentially written data to improve performance of the system. The staging includes receiving a plurality of data blocks to be written to the system. Moreover, the staging includes storing the data blocks in one of the cache lines.

BRIEF DESCRIPTION OF THE DRAWING

FIG. 8 is a flow chart showing a preferred process for recovering the state of the write cache when the storage device is powered on.

DESCRIPTION OF THE PREFERRED EMBODIMENTS

The invention will be described primarily as a log-structured write cache for use with a data storage device or system. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
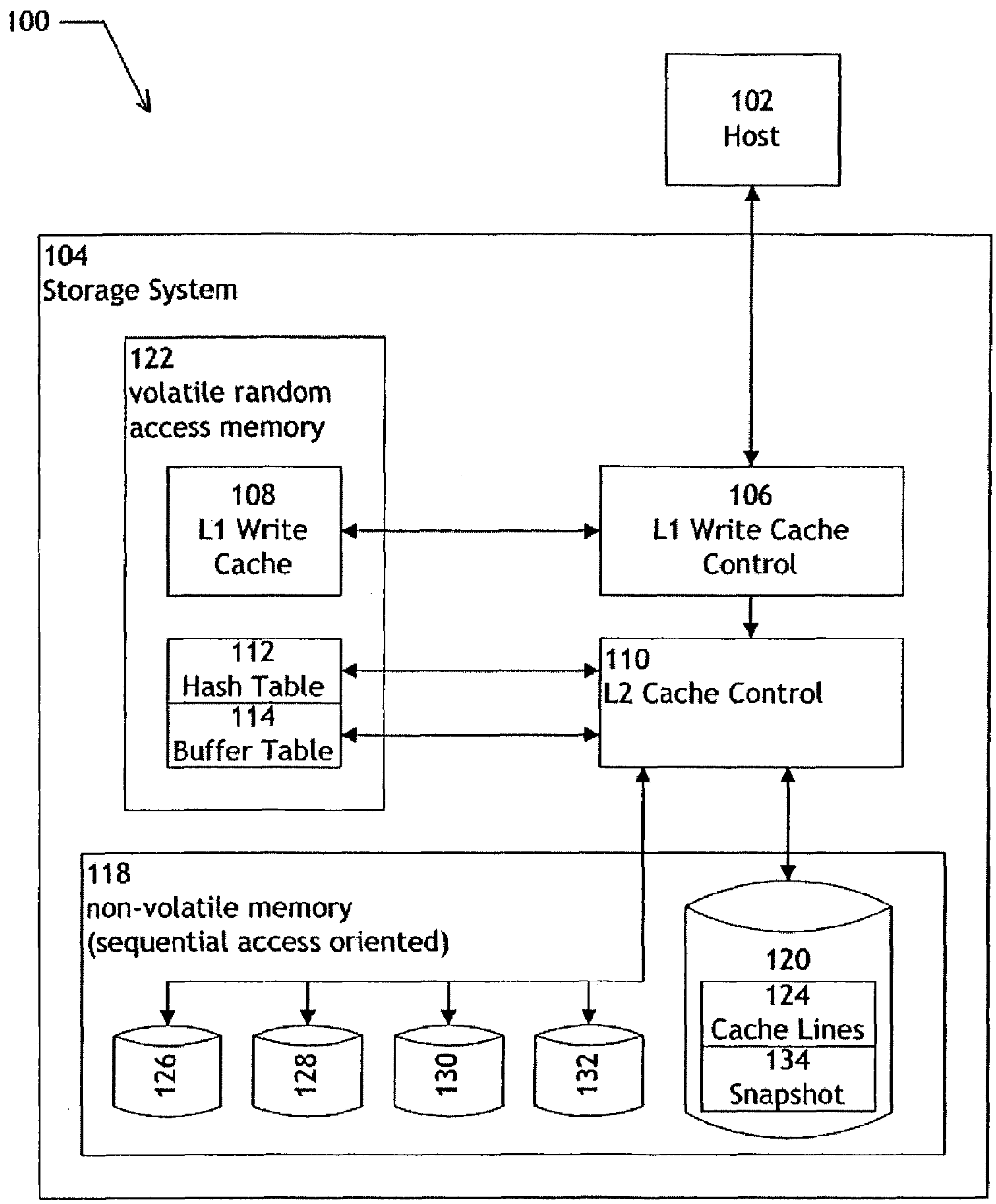
FIG. 1 is a schematic diagram showing the write cache of the invention in a storage system.

FIG. 1 shows the general configuration of the invention within a storage application 100. The host 102 accesses the storage system 104 as if it were a prior art storage system., interacting with the level 1 (L1) write cache control 106. The write cache control 106 temporarily stores data in the L1 write cache 108 which is stored in volatile random access memory (RAM) 122. The level 2 (L2) cache control 110 is passed this data and the associated meta-data to build its hash table 112 and buffer table 114 in RAM 122. In the usual case, the data and meta-data are then committed to an area 120 in non-volatile storage 120 in the firm of cache lines 124. Once the data is no longer volatile, it is acknowledged mid stored back to the host 102. Periodically, the snapshot area 134 of the cache storage will be updated byte cache control 110 to reflect the current status of the buffer table 114. Additionally, when it is conducive to do so, data are read from the cache lines 124 and written to the main storage, 126–132. The main storage may comprise a plurality of storage devices as shown, or a single device, so that 120, 126–132 reside in a single storage area.

Figure 2A:
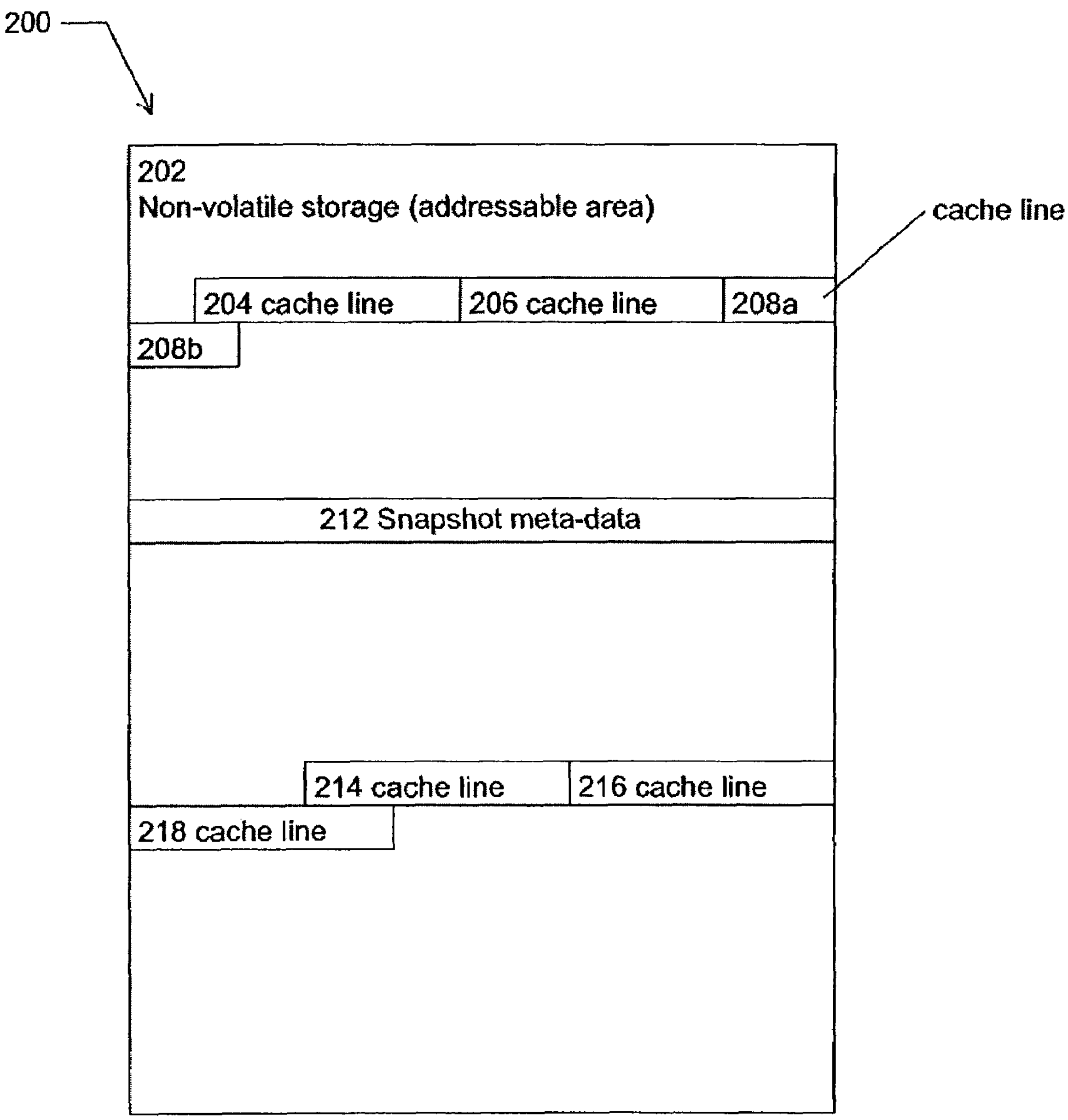
FIG. 2a illustrates a layout of cache lines, for providing a log-structured write cache and meta-data in accordance with the invention.

FIG. 2*a* shows an example of the cache line layout 200. Within the addressable area of the non-volatile storage 202, which may be part of a main storage 118, the cache lines 204–208(*b*) and 214–218 are grouped in clusters. In the illustration 202 there are two clusters of three cache lines within the data region. These clusters are aligned to be optimal for writing, and within a cluster the cache lines are written sequentially. For example, with a hard disk drive, a cache line group would correspond to one or more adjacent tracks on the disk that will be written sequentially. In a storage array, they may reside on many disks or a dedicated non-volatile storage device, again optimized for sequential write speed. The clusters in FIG. 2*a* are shown dispersed over the addressable area of the storage to reduce seek distance. Other options are to place all the cache line in one cluster to reduce recovery time, or to distribute individual cache lines to improve the performance of scarce bursty storage traffic at the expense of recovery time. An area for recording the snapshot meta-data is also allocated 212. The remaining storage area is not used for the cache, and may be used as part of the main storage area.

Snapshot meta-data 212, 134 is a location in non-volatile storage 118 that contains a snapshot copy of the meta-data for the entire cache. The snapshot helps the recovery of the system state following a shutdown. For performance reasons, the snapshot need not always be up to date. The snapshot information can also be further protected, such as by having parity sectors.

Figure 2B:
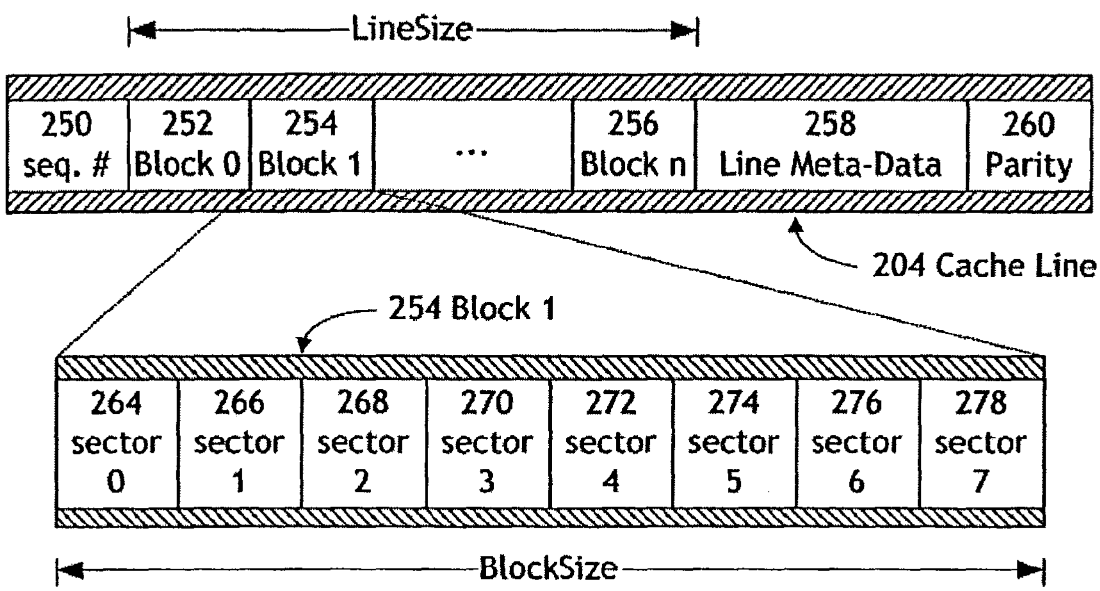
FIG. 2b illustrates further details of a cache line, including data block and sector information.

FIG. 2*b* illustrates the contents of a single cache line 204. The line comprises a plurality of data blocks 252–256, meta-data 258 associated with those blocks, an optional parity block 260, and an optional leading sequence number 250. Each cache line has a sequence number which identifies the write order of the line. It is considered part of the meta-data 258 but may precede the cache line as shown. In FIG. 2*b*, the second data block 254 in the shown cache line is identified as Block 1, and is detailed, for the case of a block size of 8 sectors, as comprising data sectors 264–278.

For a write cache, the term "post" is used to describe the operation of writing data into a cache line, and the term "flush" is used to describe the operation of moving data from a cache line to the target location.

A cache line is posted as a unit to ensure integrity of the written data, and is only posted to an empty line (a line is empty immediately after it has been successfully flushed). A "write complete" is indicated to the host 102 when the entire line is posted. Line meta-data 250, 258 contains information that is local to the line 204; thus, the post operation does not involve writing meta-data to any other location. This is key to keeping the sequential access performance. The parity block 260 is an option that provides further data integrity to protect against errors severe enough to destroy an entire block of data or the meta-data.

A key aspect of this invention is that the cache lines may contain both holes (data-reserved areas where there is no data present) and duplicates of data (where data in the main storage is plurally duplicated within the set of cache lines). This information concerning the data sectors is tracked by the L2 cache control.

The following sections describe the structure and operations of the write cache in more detail.

Line Meta-Data

The line meta-data contains information on the target address of each sector in the line so that the location and identity of the sector is known. A line is posted as a unit, providing a sequential write, and the write is identified by a sequence number 250 so that the write order can be determined later. It is possible for a sector posted to a first line as a consequence of a first write operation, to be subsequently posted to a second line as a consequence of a second write operation. A read operation must be able to locate and identify the most recently written version of a sector.

The preferred embodiment of the invention described here minimizes the amount of meta-data that must be stored in volatile RAM 122. The line meta-data 250, 258 for a cache line minimally comprises two data objects: a line sequence number and a buffer table. An example definition of these objects in the ANSI C programming language might be as follows:

```
typedef struct {
    unsigned int SeqNum:32;
    LineBufEntry LBE[LineSize];
} LineBufTable;
```

SeqNum is the sequence number for the cache line. It is shown as a 32-bit integer, but need only be large enough to handle a sequence number that is unique within a set of cache lines. Preferably, the sequence number 250 (SeqNum) and line meta-data 258 are respectively embedded at the beginning and end of the cache line 204 to ensure that the line was written correctly. LBE is the block buffer table, assuming there are LineSize block locations in the cache line. The LineBufEntry structure is described below. The line buffer table has an entry for each data block location. This entry consists of the target block number (related to the target sector address) and a bitmap indicating which at the sector locations in the block are occupied. In general, it is not expected that all the sector locations in a block will be occupied. A Bitmap equal to 0 indicates that the block is empty. Its construct in C language is:

```
typedef struct {
    unsigned int Block:32;
    unsigned int Bitmap:8;
} LineBufEntry;
```

A block has storage for a fixed number of sectors, indicated by BlockSize, that is preferably a power of 2 so that the block number is computed from the target sector address using a shift operation. Memory efficiency is enhanced by grouping sector addresses into blocks, and reflects the observation that most storage system operations manipulate more than 1 sector at once. For example, if BlockSize is 8, then the bitmap entry and the block number for a single sector address (denoted as LBA) may be computed as follows:

```
Block=LBA>>3;

Bitmap=1U<<(LBA&7);
```

Thus, it can be seen that the Block and Bitmap values are sufficient for identifying each sector address in the line. The Bitmap equation above computes the bit value for a specific sector address. These values are bitwise OR'ed to form the flail bitmap for the block. BlockSize will determine the bit length of the Bitmap element.

The cache line sequence number will be used to determine the order of posting of the lines. Certain sequence number values may be reserved to indicate, for example, that the line is empty.

Buffer Table

During operation, the line buffer tables for all the cache lines are consolidated into a single table in random access memory, the buffer table. This table has an additional element for each entry to store an index value for addressing another buffer table entry. The buffer table entry can be defined as:

```
typedef struct {
    unsigned int Block:32;
    unsigned int Bitmap:8;
    unsigned int NextEntry:16;
} BufEntry;
```

Each line buffer table is stored sequentially in the buffer table, thus each block entry in the log buffer has a specific, fixed storage address even when it does not store data references. The buffer table can be declared as:

```
BufEntry BufTable[Lines*LineSize];
```

Here, Lines is the number of cache lines. Each block entry has a fixed memory address associated with it. This provides a significant performance advantage for posting and flushing cache lines.

Hash Table

The ability to search the buffer table quickly for an sector address is needed at each data read and write operation. While there are a large number of techniques suitable for searching the cache for an sector address, a hash table of linked list entries is appropriate for searching the buffer table. A bash table provides both a small memory footprint and a rapid lookup. A hash function is used to achieve a relatively uniform spread of hashes from the sector address number or block number. An example hash would be to use the least-significant bits of the block number. A linked list is used to access all the blocks in the buffer table that correspond to the hash value.

Figure 3:
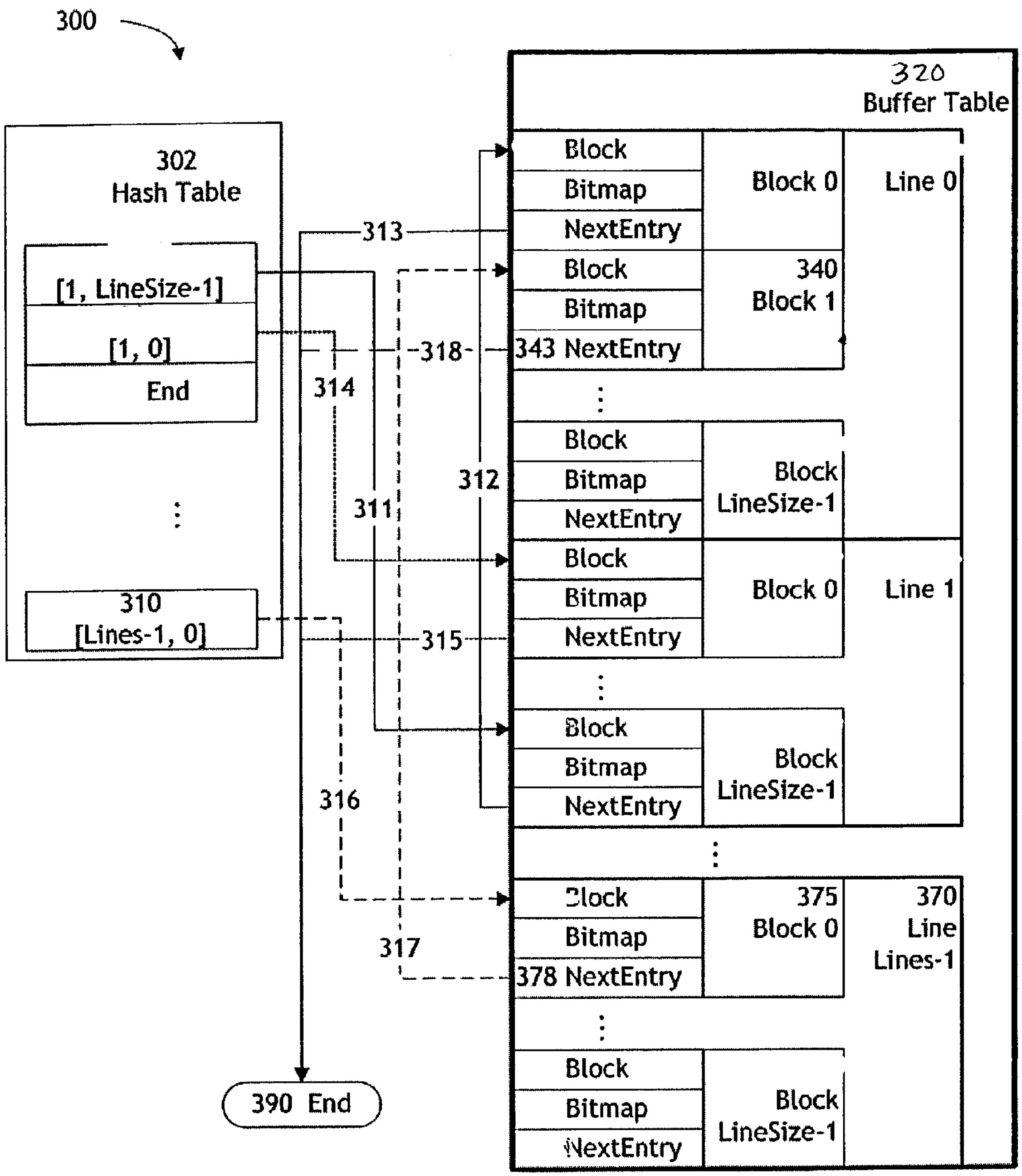
FIG. 3 shows an example of a buffer table and a hash table used in searching the buffer table in accordance with the invention.

FIG. 3 illustrates a hash table 302 and how it is used to reference the buffer table. The hash table 302 has an entry for each unique hash value where each entry is an index to an entry in the buffer table for a block that corresponds to the hash. Buffer table 320 holds the buffer entries for the cache blocks. A cache block has only a single corresponding hash entry, while many blocks can share the same hash entry. The NextEntry element holds the index of the next block in the buffer table that corresponds to the hash value. A special value, End, is reserved to indicate the end of the linked list. In general, the size of the NextEntry element is determined by the number of blocks in the cache can hold. For example, for 64,000 entries, a 16-bit NextEntry is sufficient.

FIG. 3 depicts an example configuration of a hash table 302 and linked list 311–318. In this example, hash entry 310 contains the [line, block] index of [Lines-1, 0]. This is the index to first block 375 of the last cache line 370, as indicated by connection 316. The NextEntry 378 for this block contains the index of [0, 1], as indicated by connection 317. This is the index to block 1 (340) of cache line 0 (330). Block 1 (340) is the last entry in the linked list, thus NextEntry 343 contains the index value corresponding to End 390, as indicated by connection 313. Other example connections are also shown in FIG. 3.

Increasing the length of the hash table will improve the performance when looking up a sector address in the linked list, since the length of the linked list will tend to be shorter. However, this will increase the memory requirements. There is no need to store the cache line number explicitly in the buffer table, since the value can be computed from the index value. This is a result of having a known number of blocks per line. The location of the data storage in the cache line can be computed with the above information plus the starting location for the cache line.

In the preferred embodiment of the invention, when a line is posted, the entries are loaded into the linked list starting at the hash table (the head of the list). This means that during a lookup operation, the first matching entry is the most recent. When a line is flushed, the entries will thus be removed from the end of the linked list, thereby ensuring that the sequence order is preserved.

Post Operation

Figure 4:
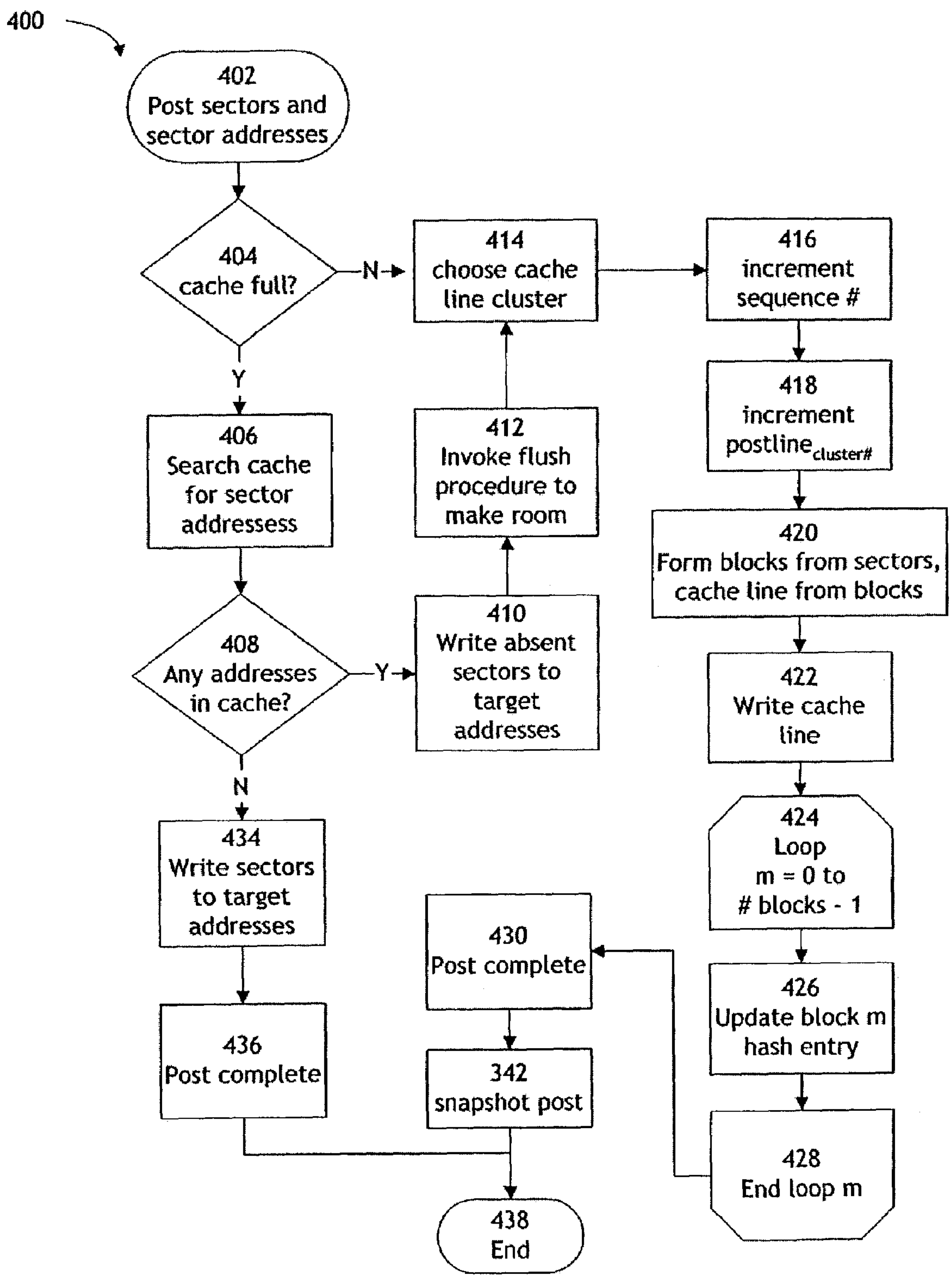
FIG. 4 is a flow chart showing a preferred embodiment of the post operation for inputting data to the cache lines of the log-structured write cache.

FIG. 4 shows the details of the post operation 400. At step 402, the post operation is passed a set of sectors and the associated addresses. The cache is checked in step 404 to see if it is full. If there are no free lines, then the cache is searched for each of the sector addresses at step 406. This involves computing the block number and bitmap for the sectors as previously described, and computing the hash value and traversing the list in the hash table searching for a match. At step 408, if none of the sector addresses are in the cache, then the sectors are written directly to the target locations at step 434, and the post operation is indicated as completed at step 436. At step 408, if any of the sector addresses were found in the cache, then the corresponding entries in the buffer table must be invalidated. The set of sectors not in the cache are written to the target sectors at step 410. At step 412, a flush operation is invoked to make room in the write cache. The set of sectors that are in the cache is then passed to step 414 to be posted. This is just one of many possible methods for keeping the cache state coherent. At step 404, if there is room in the cache, the sectors are passed to step 414.

At step 414, a cluster of the cache lines is determined that will receive the cached data. At step 416, the sequence number is incremented. The cache line pointer for this cluster, $postline_{cluster\#}$, is then incremented in wrapping or first-in-first-out (FIFO) style (i.e., modulo the number of cache lines in the cluster) in step 418. At step 420, a set of block numbers and bitmaps is created from the sector addresses, in addition to the cache line meta-data. At step 422, these are written as a unit to the cache line indicted by postline. Steps 424, 426 and 428 constitute a loop wherein the hash table is updated by adding an entry for each block in the cache line. This involves computing the bash for each block, then inserting the index to the BufTable entry for the block at the front of the linked list, and updating the next index value of the BufTable entry to point at the prior first list entry. This ensures that the linked list is sorted in order of sequence number. At step 430, the post is indicated as complete to host 102. Finally, at step 432, a snapshot post operation is signaled, which may result in a snapshot of the meta-data being written to storage. Although not shown, the list of sectors may result in multiple lines being posted.

The above description is only intended to illustrate key features of the post operation for keeping the cache state coherent. Other methods might also be used. For example, one might want to first determine the set of operations to be performed, then use an optimizing algorithm to coalesce and order the media write operations. Further, at steps 412 and 414, one might use the flush then post method of keeping the cache state coherent. Other methods are applicable, such as by modifying the system meta-data to invalidate the entries. In addition, it may be desirable to replace an existing hash entry for a block, instead of inserting the new value at the head of the list. This will keep the linked list short at the expense of additional processing to search the linked list on a post operation.

In the preferred embodiment of the invention, the cache lines are filled in a FIFO order within each cluster. In a FIFO, lines are posted in increasing order of line number, modulo the number of lines. In this configuration, each cluster has a read pointer (sequence number of the next line to flush) and a write pointer, $postline_{cluster\#}$ (sequence number of next line to post). This arrangement simplifies the recovery of the cache state upon initialization, as described later.

The post operation may be triggered by a variety of conditions. During heavy write operations, a post may be initiated when the L1 write cache is nearly full. It may also be triggered when a line's worth of data is in the L1 write cache, or when there is a drop off in the write activity, or after data has been in the L1 write cache for a certain period of time. The method based on write activity is well suited to situations where L1 write caching is not used at all. In this case, the goal is to post the lines at a rate that improves the write rate when compared with writing data in the target sectors.

Flush Operation

The flush operation is used to clear data from the cache lines and write the sectors to the target addresses. Read performance is typically enhanced compared to a fully log structured system when the cached data is moved to the target locations, since the sector addresses assigned by the host 102 are often locally contextually similar, even though they are written out of order. However, the flush operation is time consuming, and is ideally performed during idle intervals. Many storage workloads, such as those generated for desktop and mobile storage systems, are characterized by short bursts of activity (high peak I/O rates) with long intervals of inactivity (see for example, U.S. Pat. No. 5,682,273). These workloads provide many opportunities for flushing the cache lines. In fact, the idle detection algorithms of the U.S. Pat. No. 5,682,273 can be used to identify such scenarios.

Figure 5:
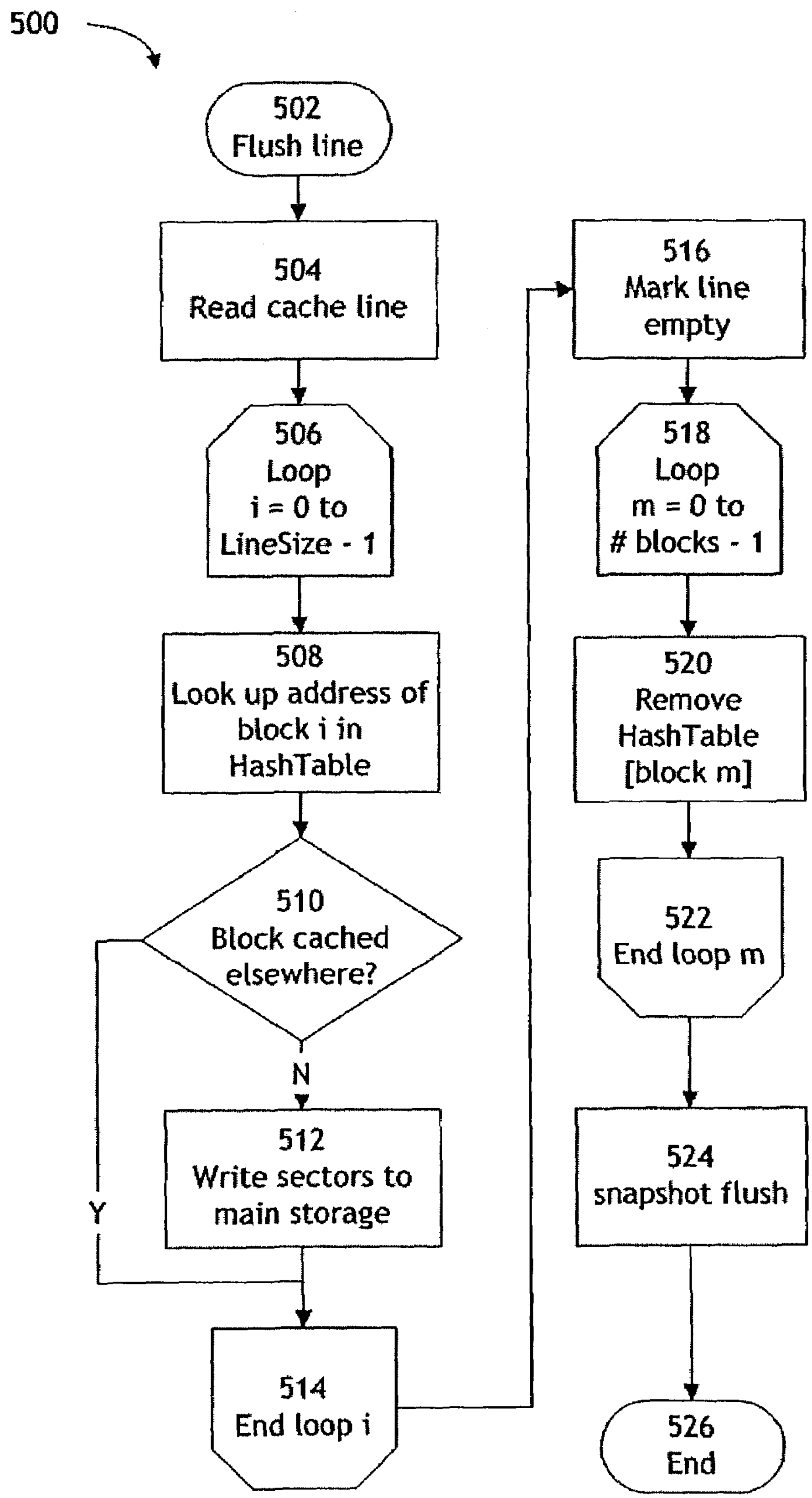
FIG. 5 is a flow chart showing a preferred embodiment of the flush operation for clearing data from the cache lines and writing the sector addresses in the cache lines to the target sector addresses.

FIG. 5 shows the details of a flush operation 500. At step 502, the flush operation is passed the line number of the oldest line in a cluster, based on the sequence number. This ensures that the write data order is always preserved. At step 504, the entire cache line is read into memory as one operation. Steps 506 through 514 constitute a loop to process all the sectors in the blocks in the cache line. At step 508, the block address entry for each block is looked up in the hash table. At step 510, the most recent entry for the sector is compared with the entry being processed. If the values do not match, then the sector in the current line is not the most recent version, and it is skipped. Otherwise, at step 512 the sector is written to the disk.

Once all the sectors have been processed, at step 516 the line is marked as empty in memory (and is reflected in non-volatile memory). Steps 518 through 522 evaluate over all the blocks that were in the line. At step 520, the hash table entry corresponding to the block is removed from the list. This is achieved by searching the linked list for the entry corresponding to the block on the current line. The entry is removed from the list by re-adjusting the next value of the prior entry in the list to point to the entry following the block entry. At step 524, the snapshot flush operation is signaled, which may result in a snapshot of the meta-data being written to storage. The empty state of the cache line is written to the non-volatile storage when the meta-data is updated. It is not critical to have the empty state reflected immediately in the meta-data. If the system state is lost, such as due to an unexpected power loss, the result would be that a line would be inconsequentially flushed again.

Although only the key operations for flushing a cache line were described, other variations of this process are possible. For example, the sectors need not be written in order as shown at step 512. In addition, it is beneficial to utilize an reordering algorithm to coalesce and sort the writes for optimum performance.

Data Write Operation

Figure 6A:
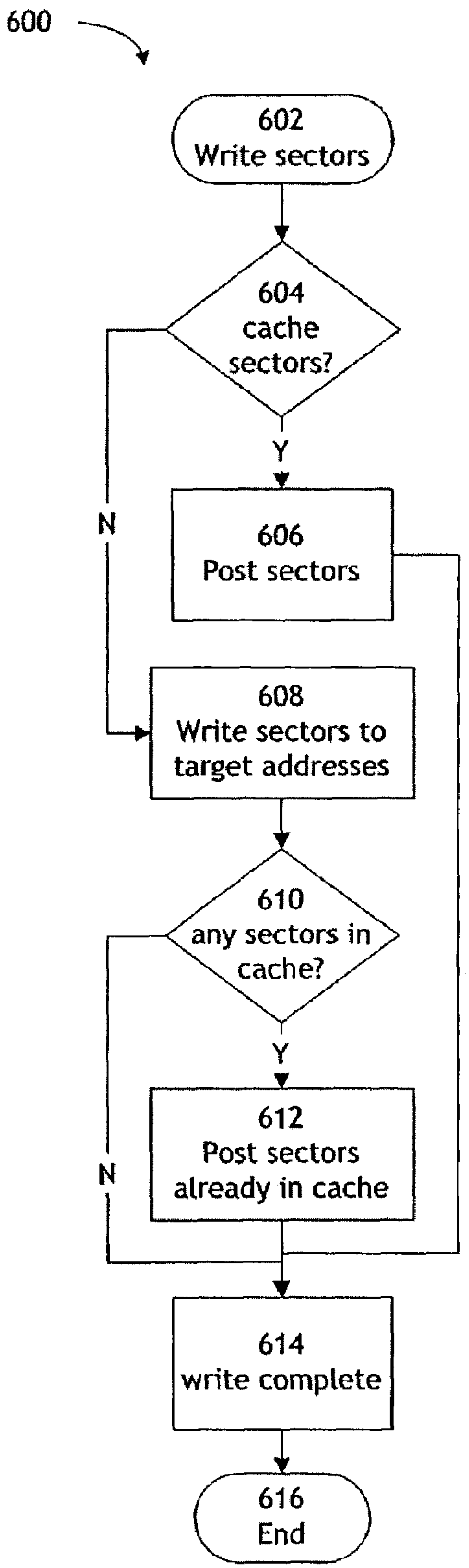
FIG. 6a is a flow chart showing a preferred process for writing data to a storage device in the presence of a write cache.

FIG. 6*a* shows the details of a data write operation 600. At step 602, the write operation is passed a set of sectors and the associated addresses. At step 604, a determination is made if the data should be cached. For example, it is likely to be beneficial for large sequential writes to bypass the write cache. If the sectors are to be cached, then at step 606, the post operation is passed the list of sectors. Once the post completes, a write complete is indicated at step 614. If the cache is bypassed, then the data is written directly to the target sector addresses at step 608.

As in the post operation, any sectors currently in the write cache must be invalidated. At step 610, the cache is searched to see if any of the sectors currently exist in the cache. If there are none, then a write complete is indicated at step 614. At step 610, if any sectors were in the cache, then the corresponding cache entries will be invalidated. In the preferred embodiment of the invention, these remaining sectors are placed in a reduced list that is passed to the post operation at step 612. Once the post completes, a write complete is indicated at step 614. This description is designed to illustrate only the key features for writing data. For example, performance is improved by first identifying all the operations, then using a reordering algorithm to coalesce and optimize the write order.

Data Read Operation

Figure 6B:
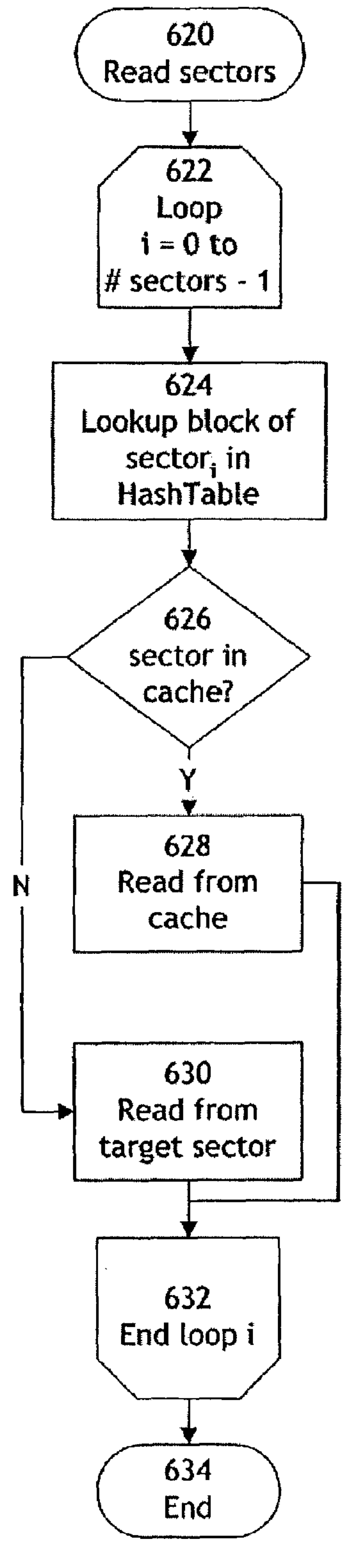
FIG. 6b is a flow chart showing a preferred process for reading data from a storage device in the presence of a write cache.

FIG. 6*b* shows the details of a data read operation 600. At step 620, the read operation is passed a set of sector addresses. Steps 622 through 632 are executed for every sector address. At step 624, the block and bitmap corresponding to the sector address is looked up in the hash table. At step 626, if the sector was found in the cache, then at step 628 the sector is read from the cache line determined from the hash table entry. If the sector was not found in the cache, it is read from the given sector address, at step 630. Further enhancements to this process are possible. For example, performance could be improved by building up lists of data locations in the loop, then using a reordering algorithm to coalesce and optimize the read order.

Snapshot Operation

The snapshot operation is used to provide a nearly up-to-date copy of the cache meta-data. Allowing the snapshot to be slightly out of date improves the system operational performance. There are two variations of the snapshot operation; one for post operations and one for flush operations. It is beneficial to place an upper bound on the number of cache operations between snapshots. A snapshot can be taken every N posts and every M flushes. Since the flush operation generally occurs in the background, M=1 is likely to be a good choice. A value of N between 10 and 20 is likely to provide a reasonable trade-off between performance impact and recovery time.

Figure 7A:
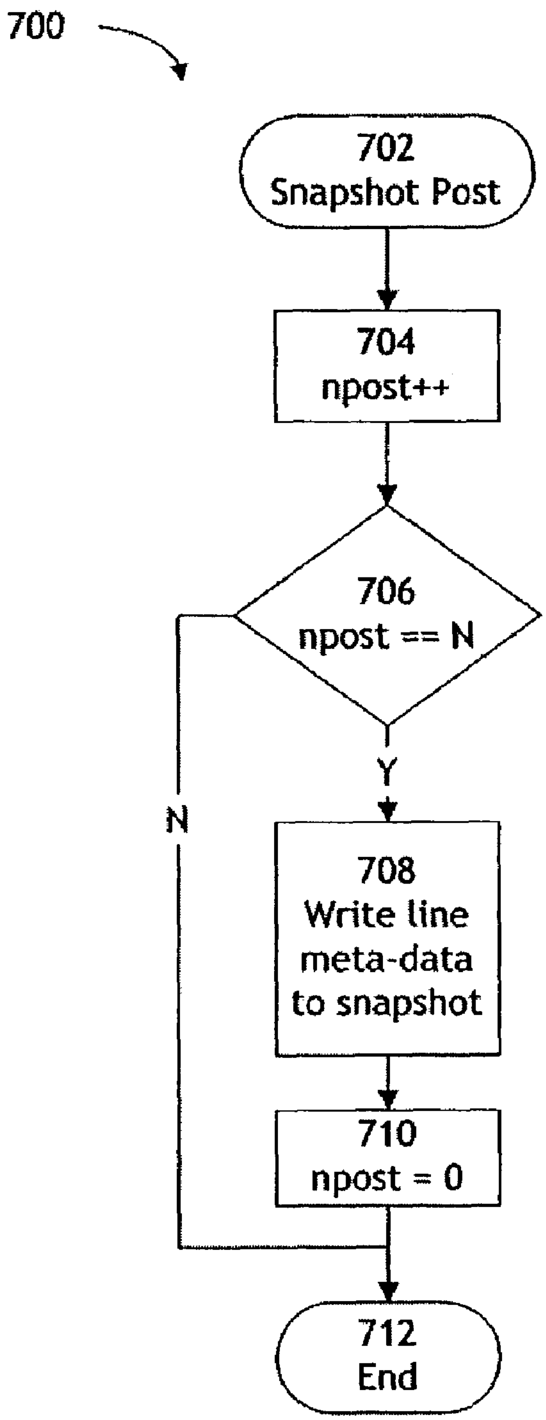
FIG. 7a is a flow chart showing a preferred embodiment of the snapshot operation in response to a post operation.

FIG. 7*a* shows the details of a snapshot operation in response to a post operation 700. At step 704 a post counter is incremented. At step 706, the counter is tested to see if a snapshot is required. If not, the operation is finished. If it is time for a snapshot, control passes to step 708 where the snapshot meta-data for the N previously posted lines is committed to the snapshot area 212. The posted lines are those with the most recent sequence numbers. At step 710, the counter value is reset, indicating completion of the snapshot.

Usually, the meta-data for a cache line will occupy less than one sector. By posting N sectors at once, the snapshot update is also a streaming operation for improved performance.

Figure 7B:
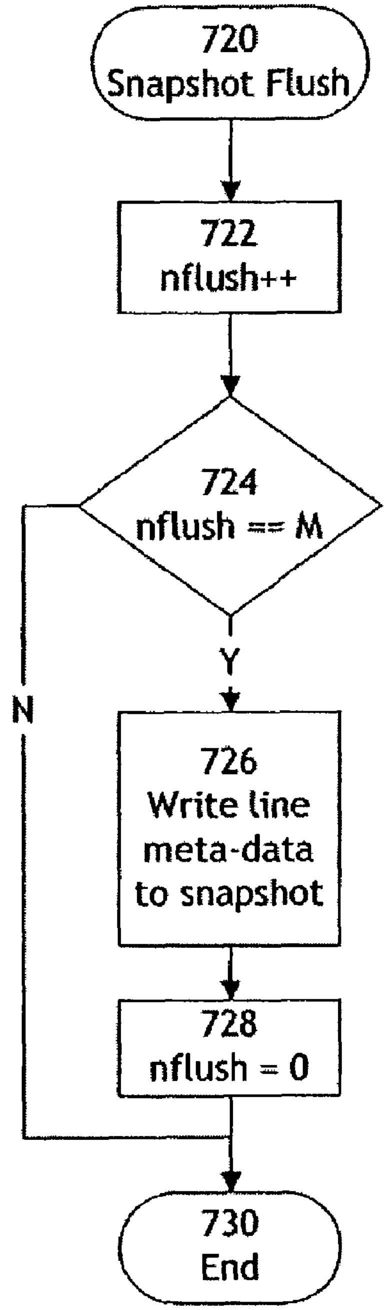
FIG. 7b is a flow chart showing a preferred embodiment of the snapshot operation in response to a flush operation.

FIG. 7*b* shows the details of the snapshot operation responsive to a flush operation 700. The operation is analogous to the snapshot post operation. The difference is that at step 726, the line meta-data corresponding to the most recently flushed lines are overwritten with meta-data indicating that the line is empty. For example, by using the sequence number that was reserved for empty lines.

Recovery Operation

When the system is initialized, it is necessary to properly recover the state of the non-volatile write cache. If the system has a method for indicating a clean shutdown, then a complete snapshot can be taken prior to the shutdown, and the recovery is consequently limited to reading the snapshot. For example, many storage systems can use a dirty flag that is set upon a first write, and cleared upon a clean shutdown. If the dirty flag is not set, then the snapshot is known to be good. Otherwise, the state of the snapshot cannot be guaranteed to be valid and the cache meta-data must be rebuilt from the cache and the snapshot.

Figure 8:
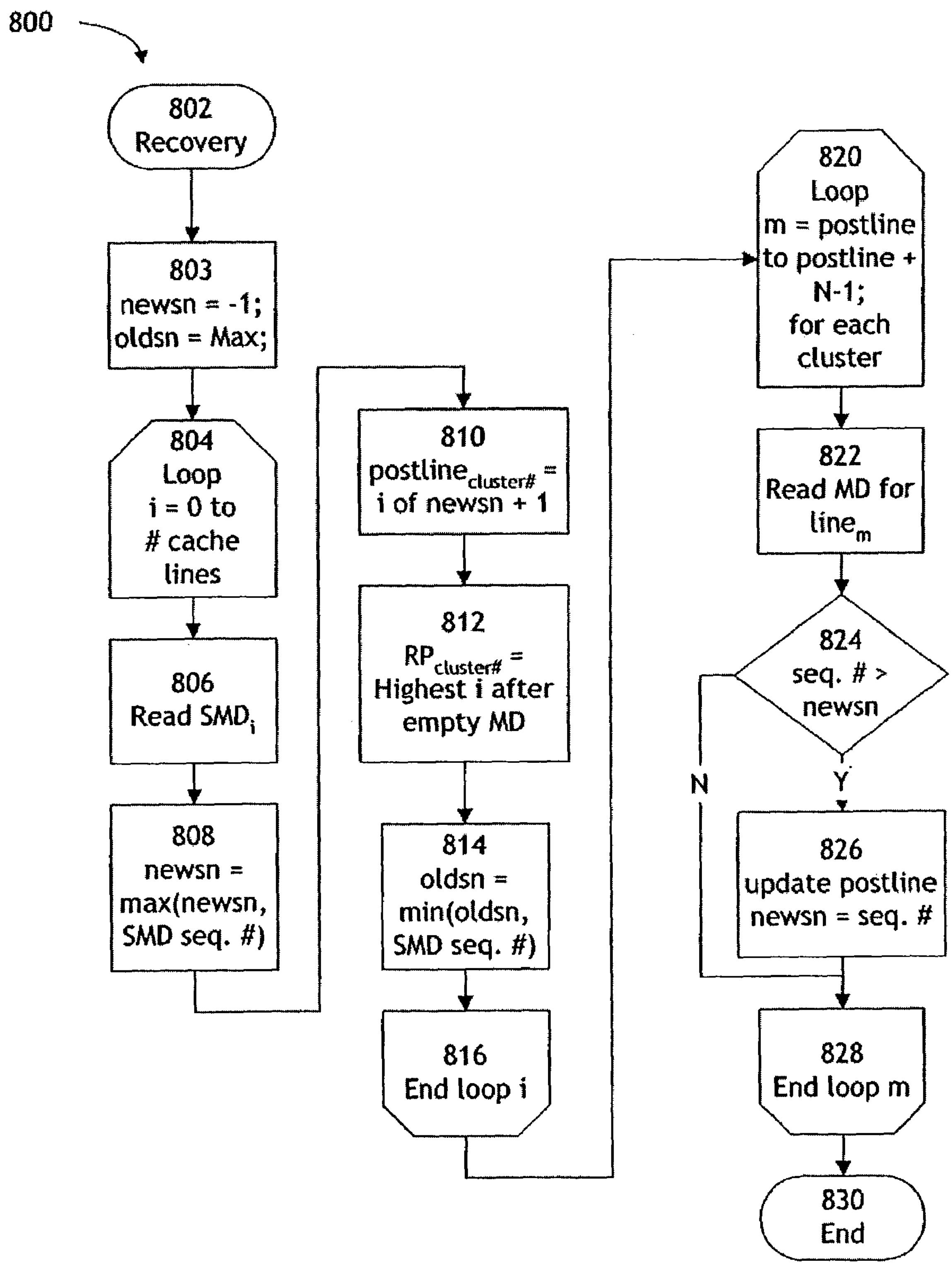

FIG. 8 shows the details of a recovery operation 800. Step 803 initializes the value of the newest sequence number (newsn) and the value of the oldest valid sequence number (oldsn). Steps 804 through 816 are a loop over all the line values in the cache. At step 806, the snapshot meta-data (SMD) for a line is read. The newest sequence number in the snapshot is updated in step 808. At step 810, the cache write pointer for the cluster of this cache line (next line number to use for a post operation, $\text{postline}_{cluster\#}$) is computed as the index of the line corresponding to the newest sequence number in the cluster. At step 812, the read pointer (next line number to use for a flush operation) is determined as the highest line number (subject to a FIFO wrap condition) after the cache meta-data indicating empty lines. At step 814 the oldest sequence number is computed. Upon completion of the loop, all the snapshot meta-data is in memory. Furthermore, the newest sequence number, read pointer for every cluster, write pointer for every cluster and oldest sequence number are now known.

Steps 820 to 828 are a loop over line values in all the clusters, from the write pointer (postline) to the maximum number of lines that may have been posted prior to a snapshot (N−1). At step 822 the meta-data for a line is read. At step 824, the sequence number for this line is compared with the newest sequence number. If the sequence number is less than the newest sequence number, or the sequence number indicates that the line is empty, then the there are no further lines to examine and the recovery operation is complete at step 830. Otherwise, the current line is not part of the snapshot hence. At step 826, the write pointer postline is incremented (FIFO style) and the newest sector number updated. At the conclusion of the loop, the most recent values of postline and the sequence number will be known.

The hash table is not stored in the meta-data. It is reconstructed from the line meta-data by loading all the block entries in order of increasing sequence number (as if the data were posted). This guarantees that the list order for each block is preserved, although the order of list entries for different blocks may be altered. However, this is inconsequential. Further, it may be beneficial to use a more sophisticated method for rebuilding the hash table. For example, the linked list length is minimized by only loading the entry for each sector with the highest sequence number.

The above example describes the case of M=1 (snapshot on every flush). The case of M>1 will have an additional loop similar to steps 820 through 828 for locating the read pointer. The use of the snapshot eliminates the need to update the meta-data in a cache line once it is flushed. It may also be noted that it is not required that the snapshot area 212 reside in one contiguous address block.

Data Integrity

It is vital that the state of the log buffer system is always well defined. It is required that the system always return the most recently written data for each read request to that address. Therefore, the system must have a well defined state at all times, and this state must be reflected in the persistent data stored on the recording medium. For example, forcing the post operation to write the cache line in order ensures that a partial write can be detected. Integrity is further enhanced by encoding the sequence number within each sector in the cache line. This can be achieved by using a reserved location in each sector, or pre-coding the sequence number into a sector check area. A partially written cache line can be treated as empty, since the operations were not acknowledged as completed to the host 102. A partial write in the snapshot can also be detected by a break in the sequence number order from the cache line order. The recovery procedure previously described can recover any posted lines that have not been updated in the snapshot. Any flushed lines that are not reflected in the snapshot can be flushed again.

When used with a multi-sector error correcting code (ECC), such as sequential sector parity, it is beneficial for the buffer line to be an integral number of ECC addressable units, and for the parity to be an entire ECC addressable unit.

Implementation Example

The random access memory footprint of this embodiment is very small compared to the capacity of the cache. In the case of a BlockSize of 8, each buffer table entry is 7 bytes. Thus, it takes less than 1 byte per cache sector for the buffer table. The size of the hash table is a balance between the desired lookup performance and the memory required. In general, the computational performance will depend on the length of the hash table and linked list. The memory footprint can be computed as follows. The size of the hash table in bytes is twice the number of entries (up to 64 K entries). The buffer table size is equal to (7 bytes×LineSize×number of lines).

Consider a 5400 rpm mobile hard disk drive as a non-limiting example of a storage system. A solitary cluster of cache lines located near the center of the data area (the MD) is chosen to minimize HDD seek distances. For this disk drive, there are 416 sectors per track at the MD. There will be 2 cache lines per track, with 208 sectors each, 1 parity block and 1 block for all the meta-data. Therefore, the LineSize is 24 blocks with a BlockSize of 8. There will be 512 lines, occupying 256 tracks, giving 12,288 blocks in the cache. A hash size of 16K entries is thus suitable. Table 1 shows the size of the various memory structures required. (K here is a factor of 1024.)

This cache has a capacity of approximately 48 MB, yet the meta-data footprint is less than 128 KB. In general, the full capacity will not be available due to the block structure. Assuming a typical I/O is 4 KB, the cache capacity could be as low as about half, or 24 MB, since a non-aligned 8 sector I/O would occupy 2 blocks.

TABLE 1

| Item | Size |
|---|---|
| Buffer Table | 84 KB |
| Hash Table | 32 KB |
| Memory Footprint | 116 KB |

The recovery time for this design can be estimated from the rotational period and the one track seek time. The snapshot meta-data is the size of the buffer table. Allowing each the meta-data for each line to occupy a full sector, requires 512 sectors, or less than two tracks. Choosing the maximum snapshot interval for posts to be N=20, and for flushes to be M=1, means the worst case involves reading from 12 tracks (20/2+1) cache tracks plus the snapshot. In this example, the period is 11.1 ms, the one track read seek is 2.5 ms, resulting in a 200 ms recovery time. This should not significantly affect the system latency, since the prior art startup time is about 1.7 s without a log write cache.

Extensions

The performance of a storage system with a write cache can be improved by removing out-of-date entries (duplicate sectors with older sequence numbers) from the linked list. The flush operation provides a unique opportunity, since it traverses the hash list to find the end token. Any out of date entries can be removed as they are encountered. Further, there is no need to flush any out-of-date sectors for the line being flushed. The cache lines need not be of equal capacity, and the number of cache lines per group can vary as well. These situations are easily handled in the cache table, for example with the addition of a table of line sizes. This approach is helpful when utilizing distributed cache tracks in a zoned recording system, where the number of contiguous uninterrupted sectors varies. One implementation would be to keep a constant number of cache lines per track, but vary the line size. It may also be beneficial to treat a distributed cache as a set of FIFOs, rather than as a single FIFO. This would allow for the localization of data to the cache when the operations concentrate in different areas of the addressable storage area.

It may be beneficial to leave a few empty sectors on a cache line or group or group for defect management. Keeping the cache lines rapidly accessible is key to performance. Therefore, it would be detrimental to have defects within the cache line group. Such defects would require the cache lines to be re-assigned. This can be achieved by choosing defect-free regions to be assigned to be cache lines. Alternately, the defect management can be handled within the cache line group itself. While the parity could be used directly, it is possible to use slack space within the line group to re-map sectors.

The system performance when the cache is full can be improved by expanding the snapshot meta-data to include invalidation information. This would reduce the need to either flush the cache or modify the existing meta-data when invalidating a sector in a full cache. It can also reduce the number of write operations to invalidate cache entries during data write operations.

Having a fixed location for the cache lines can result in disproportionate I/O access to a localized region of the address space, which in some storage systems may be detrimental to reliability and long-term performance. An algorithm can be used to move the access location periodically, and the flush operation will also change the access location. Another alternative is to move the cache lines to a different location periodically. This can be achieved following a full flush, although this is not required. Data from the new location would be swapped with the empty cache line. The cache line can also be resized if the storage characteristics are different in the new region.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A data storage system including:

a data storage device to store data as data blocks, wherein each data block is associated with a sector address;

a write cache included within the data storage device, wherein the write cache includes a plurality of cache lines and, wherein each of the cache lines includes a plurality of data blocks, line meta-data to identify each data blocks sector address, and a sequential number indicating the order of the data blocks within their respective cache line relative to the data blocks in other cache line; and a staging area within the write cache, to stage write data, wherein staging write data includes:

receiving a plurality of data blocks to be written to the system;

storing the data blocks in one of the cache lines;

generating meta-data for the cache line, the meta-data including a sequence number for the cache line and the addresses for the data blocks; and storing the meta-data into the cache line.

2. The storage system of in claim 1, wherein each cache line further comprises a parity block to enable the recovery of data in the cache line in the event of partial loss of the cache line.

3. The storage system of in claim 1, wherein write data is posted to the write cache before being written to the system at the sector addresses.

4. The storage system of claim 1, wherein the write cache is maintained in a non-volatile memory of the system.

5. The storage system of claim 1 further comprising a write cache control for interacting with a host system and the write cache.

6. The storage system of claim 1, wherein the line meta-data includes a sequence number for identifying the cache line.

7. The storage system of claim 1, wherein the line meta-data includes a line buffer table having a plurality of entries, each entry having a target sector address and a bitmap indicating sector locations in a block that are occupied.

8. The storage system of claim 7, wherein the line buffer tables for all of the cache lines are integrated into a buffer table to allow a sector address to be searched.

9. The storage system of claim 8, wherein the buffer table is searched using a hash table.

10. The storage system of claim 9 further comprising a cache control for managing the buffer table and the hash table.

11. The storage system of claim 1, wherein the medium includes a snapshot of the line meta-data for the entire write cache, the snapshot being used for recovering data in case of a system shutdown.

12. The storage system of claim 1, wherein the cache lines are grouped together as clusters on the medium.

13. The storage system of claim 1, wherein the storage system is a disk drive.

14. The storage system of claim 1, wherein the storage system is a optical disk drive.

15. The storage system of claim 1, wherein the storage system is a disk array.

16. The storage system of claim 1, wherein the storage system is a storage server.

17. A method for improving the performance of a storage system having a medium for storing data as data blocks, each data block associated with a sector address, comprising:

providing a write cache on the medium, the write cache includes a plurality of cache lines and, wherein each of the cache lines includes a plurality of data blocks, line meta-data to identify each data blocks sector addresses, and a sequential number indicating the order of the data blocks within their respective cache line relative to the other data blocks in cache lines; and staging write data in the write cache as sequentially written data to improve performance of the system, wherein staging write data includes:

receiving a plurality of data blocks to be written to the system;

storing the data blocks in one of the cache lines;

generating meta-data for the cache line, the meta-data including a sequence number for the cache line and the addresses for the data blocks; and storing the meta-data in the cache line.

18. The method of claim 17 further includes:

computing a plurality of parity blocks for data in the cache line; and writing the parity blocks to the cache line.

19. The method of claim 17 further includes:

providing a snapshot area on the medium; and writing a copy of the meta-data for the cache lines in the snapshot area after data is written into the write cache.

20. The method of claim 19 further includes determining a state of the write cache following an initialization based on the snapshot meta-data.

21. The method of claim 20, wherein determining includes:

reading the snapshot meta-data;

determining the cache lines that contain currently cached data; and determining the state of the write cache based on the meta-data associated with the determined cache lines.

22. A computer-program product, including:

a computer program storage device including a write cache, wherein the write cache includes a plurality of cache lines and, wherein each of the cache lines includes a plurality of data blocks, line meta-data to identify each data blocks sector address, and a sequential number indicating the order of the data blocks within their respective cache; and computer-readable instructions on the computer program storage device for causing a computer to undertake method acts for staging write data in the write cache as sequentially written data, the method acts including:

receiving a plurality of data blocks to be written to the system;

storing the data blocks in one of the cache lines;

generating meta-data for the cache line, the meta-data including a sequence number for the cache line and the addresses for the data blocks; and storing the meta-data into the cache line.

23. The computer program product according to claim 22 further includes computer-readable instructions for:

computing plurality of parity block blocks for data in the cache line; and writing the parity blocks to the cache line.

24. The computer program product according to claim 22 further includes computer-readable instructions for:

providing a snapshot area on the medium; and writing a copy of the meta-data for the cache lines in the snapshot area after data is written into the write cache.

25. The computer program product according to claim 24 further includes computer-readable instructions for determining a state of the write cache following an initialization based on the snapshot meta-data.

26. The computer program product according to claim 25, wherein determining includes:

reading the snapshot meta-data;

determining the cache lines that contain currently cached data; and determining the state of the write cache based on the meta-data associated with the determined cache lines.

* * * * *